US011223645B2

(12) United States Patent
Tyers et al.

(10) Patent No.: US 11,223,645 B2
(45) Date of Patent: Jan. 11, 2022

(54) DEEP INTELLIGENCE CONTEXT ENGINE (71) Applicant: PAYPAL, INC., San Jose, CA (US)

(72) Inventors: Kevin Tyers, San Jose, CA (US); Bradley Wardman, San Jose, CA (US); Nathan Robert Pratt, San Jose, CA (US); Blake Butler, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 393 days.

(21) Appl. No.: 16/160,834

(22) Filed: Oct. 15, 2018

(65) Prior Publication Data
US 2020/0120127 A1 Apr. 16, 2020

(51) Int. Cl.
*H04L 29/00* (2006.01)
*H04L 29/06* (2006.01)
*G06Q 20/40* (2012.01)

(52) U.S. Cl.
CPC ..... *H04L 63/1433* (2013.01); *G06Q 20/4016* (2013.01); *H04L 63/0236* (2013.01); *H04L 63/102* (2013.01)

(58) Field of Classification Search
CPC ............ H04L 63/205; H04L 63/1441; H04L 63/1433; H04L 63/104; H04L 63/0236; H04L 63/102; G06Q 20/382; G06Q 20/405; G06Q 20/4016
See application file for complete search history.

(56) References Cited

U.S. PATENT DOCUMENTS

| | | | |
|---|---|---|---|
| 8,726,407 B2 * | 5/2014 | Etchegoyen | G06F 21/88 726/34 |
| 8,776,168 B1 | 7/2014 | Gibson et al. | |
| 9,578,053 B2 * | 2/2017 | Husain | H04L 63/145 |
| 9,672,355 B2 | 6/2017 | Titonis et al. | |

(Continued)

FOREIGN PATENT DOCUMENTS

| | | |
|---|---|---|
| CN | 107798597 | 3/2018 |
| TW | M555988 | 2/2018 |

OTHER PUBLICATIONS

Huang, Zhexue, "Extensions to the k-Means Algorithm for Clustering Large Data Sets with Categorical Values", Data Mining and Knowledge Discovery 2, 1998, pp. 283-304.

(Continued)

*Primary Examiner* — Don G Zhao
(74) *Attorney, Agent, or Firm* — Haynes and Boone, LLP (57) ABSTRACT

Methods and systems are presented for providing enriched technical security data to a risk engine of an online service provider, and for adjusting security settings based on the enriched data. The enriched security data may be generated by recursively deriving additional security information from an initial security data input. The initial security data input may be associated with a risk source, such as a person or a device that submits an electronic request to the online service provider. Based on the initial security data input, the risk engine may recursively derive additional security information that enriches the initial security data input. The risk engine may then use the derived security information as well (Continued)

as the initial security data input to assess a risk level of the risk source, and then adjust a security setting of the online service provider based on the assessed risk level of the risk source.

20 Claims, 7 Drawing Sheets

(56) References Cited

U.S. PATENT DOCUMENTS

| | | | | |
|---|---|---|---|---|
| 10,484,419 B1* | 11/2019 | Davis | | G06F 21/577 |
| 2001/0014167 A1* | 8/2001 | Gifford | | G07C 9/37 |
| | | | | 382/117 |
| 2009/0089869 A1* | 4/2009 | Varghese | | G06Q 20/4014 |
| | | | | 726/7 |
| 2015/0039512 A1* | 2/2015 | Adjaoute | | G06Q 20/325 |
| | | | | 705/44 |
| 2015/0046216 A1* | 2/2015 | Adjaoute | | G06Q 30/0201 |
| | | | | 705/7.29 |
| 2015/0046224 A1* | 2/2015 | Adjaoute | | G06Q 20/4016 |
| | | | | 705/7.31 |
| 2015/0046332 A1* | 2/2015 | Adjaoute | | G06N 20/00 |
| | | | | 705/44 |
| 2015/0066771 A1* | 3/2015 | Adjaoute | | G06Q 20/4016 |
| | | | | 705/44 |
| 2015/0073981 A1* | 3/2015 | Adjaoute | | G06Q 30/0225 |
| | | | | 705/39 |
| 2015/0227935 A1* | 8/2015 | Adjaoute | | G06F 21/60 |
| | | | | 705/44 |
| 2016/0005029 A1* | 1/2016 | Ivey | | G06Q 20/409 |
| | | | | 705/44 |
| 2017/0147338 A1* | 5/2017 | Jackson | | G06F 11/36 |
| 2017/0257388 A1 | 9/2017 | Addepalli et al. | | |
| 2018/0013782 A1* | 1/2018 | Choyi | | H04L 63/083 |
| 2018/0053114 A1* | 2/2018 | Adjaoute | | G06N 3/126 |
| 2018/0139227 A1 | 5/2018 | Martin et al. | | |
| 2018/0150843 A1* | 5/2018 | Adjaoute | | G06N 5/04 |
| 2019/0279218 A1* | 9/2019 | Adjaoute | | G06N 5/043 |
| 2019/0295089 A1* | 9/2019 | Jia | | G06N 3/02 |

OTHER PUBLICATIONS

Kim, Byoungwook, "A Fast K-prototypes Algorithm Using Partial Distance Computation", Symmetry, Apr. 21, 2017, pp. 1-10, vol. 9, Issue 58, Basel, Switzerland.

* cited by examiner

DEEP INTELLIGENCE CONTEXT ENGINE

BACKGROUND

The present specification generally relates to digital security, and more specifically, to deep extraction of security information to improve the security and functionality of online computer systems that may be subject to malicious attack, according to various embodiments of the disclosure.

RELATED ART

Computer systems that provide electronic services (e.g., online services) are constantly under attack from malicious actors with the intention of disrupting electronic services, obtaining personal gain, or both. Examples of such attacks include denial-of-service attacks, account take-overs, credential stuffing, thefts of account property by way of performing fraudulent electronic transactions, etc. Even with advanced security measures, malicious actors are still able to find ways to continue to launch attacks against electronic services.

An online service provider may use an access control mechanism such as a blacklist and/or a whitelist to prevent attacks. For example, known sources of cyber-attacks (e.g., an Internet Protocol (IP) addresses of devices previously used by cyber-attackers) may be included in the blacklist, and known sources of legitimate users (e.g., IP addresses used by devices of legitimate users) may be included in the whitelist. These lists may be maintained and/or shared by one or more online service providers such that requests for connections from a source identified in the blacklist may be denied while requests for connections from a source identified in the whitelist may be allowed. However, as cyber-attackers become more sophisticated, they may utilize advanced techniques (e.g., by using a large set of proxies and botnets, etc.) to circumvent access control mechanism. Simply attempting to blacklist certain connection attempts, for example, is not a fully adequate digital security solution

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing enriched security data to a risk engine of an online service provider for improving the security of the online service provider according to various embodiments. The enriched security data may be generated by recursively deriving additional security information based on an initial security data input. The initial security data input may be associated with a risk source. In various embodiments, the term "risk source" as used herein, may refer to a person and/or a device that may access the online service provider over a network. A risk source may be associated with a specific network attribute (e.g., a network address). Based on the initial security data input, the risk engine may recursively derive additional security information that enriches the initial security data input. The risk engine may then use the derived security information as well as the initial security data input to assess a risk level of the risk source, and then adjust a security setting of the online service provider based on the assessed risk level of the risk source. This approach provides for a multi-layered, recursive data analysis that allows for more sophisticated threat and risk modeling than schemes that might simply analyze threat information in a single pass (e.g. without recursive analysis).

In some embodiments, the initial security data may comprise an attribute of the risk source. Examples of the initial security data may include an Internet Protocol (IP) address of a device used to submit the request, a user name of an account that is associated with the request, contact data (e.g., a phone number, an email address, etc.) associated with the account, and any other attribute associated with the person or the device. The risk engine (or any computing system) of the online service provider may obtain the initial security data based on a request submitted to the online service provider. The request may be a log-in request associated with a user account, a request to create a new account, a request for performing an electronic transaction (e.g., a payment transaction), or a request to access a function or a service offered by the online service provider, in various embodiments. More broadly, the request may be any electronic request that may have a risk analysis performed before determining whether and how to respond to the request. As such, the risk engine may analyze the request to derive the initial risk data. For example, by analyzing the network packets associated with the request, the risk engine may obtain the IP address of the device that submits the request. In another example, the risk engine may parse the request to obtain an account identifier (e.g., a user name, contact data, etc.) associated with the person who submits the request.

After obtaining the initial security data, the risk engine may enrich the initial security data by recursively deriving additional security information based on the initial risk data, where the additional security information cannot be obtained solely from the request. For example, the risk engine may derive a first level of additional security information using the initial risk data in a first recursive level. The risk engine may then derive a second level of additional security data using the first level of additional security information in a second recursive level. The risk engine may continue to derive more levels of additional security data using a previous level of additional security data until a predetermined recursive level (or some other criteria) has been reached.

Consider an example in which the risk engine uses the IP address of the device that submits the request as the initial security data. To enrich this initial security data, the risk engine may first derive additional security data based on the IP address. For example, as part of deriving the additional security data in the first recursive level, the risk engine may derive a Classless Inter-Domain Routing (CIDR) range that is associated with the IP address. The risk engine may also derive a domain name of the domain that is associated with the IP addresses. The risk engine may also derive a set of services offered by the IP address. As such, in this example, the risk engine derives the first level of additional security information that includes the CIDR range, the domain name, and the set of services. As discussed above, the risk engine may recursively derive additional security information. Thus, the risk engine may derive a second level of additional security information based on the CIDR range, the domain name, and/or the set of services as part of a second recursive level. For example, based on the CIDR range associated with the IP address, the risk engine may derive an identifier of an autonomous system (e.g., an autonomous system number (ASN)) that is associated with the CIDR range, an age of the CIDR range, and a route associated with the CIDR range. Based on the domain name associated with the IP address, the risk engine may derive a cost associated with the domain name, a top-level domain associated with the domain name, and whether a secure sockets layer (SSL) is used by the domain. Based on the set of services offered by the IP address, the risk engine may derive one or more port numbers that are used to offer the set of services, a version of the set of services, and a banner associated with the set of services.

The risk engine may continue to recursively derive additional security information until the risk engine has reached a pre-determined recursive level (or satisfied other specified criteria). The additional security information may be derived in different ways. In some embodiments, the risk engine may derive the additional security information by analyzing the previously derived information. For example, the risk engine may parse the domain name ("www.xyz.agency") associated with the IP address to extract the top-level domain (".agency") associated with the domain name. In some embodiments, the risk engine may derive the additional security information based on a look-up table or an external source. For example, the risk engine may derive the CIDR range from the IP address based on a look-up table that is stored within the risk engine. The risk engine may derive the domain name associated with the IP address by querying a domain name server (DNS) using the IP address. In some embodiments, the risk engine may derive the additional security information by sending requests to a device associated with the initial security data. For example, the risk engine may "ping" a device based on the IP address to retrieve a list of services offered by the device and the port numbers through which the services are offered by the device.

As discussed herein, the risk engine may recursively derive additional security information until a predetermined recursive level is reached. In some embodiments, the risk engine may determine a fixed recursive level for all risk assessments. However, in some other embodiments, the risk engine may dynamically determine a recursive level for different risk assessments. For example, when the initial security data (e.g., the IP address) is obtained from a request received by the online service provider, the risk engine may determine the recursive level for enriching the initial security data based on one or more attributes of the request (that is, specific different requests may be handled differently in terms of data recursion). In one example, the risk engine may determine the recursive level based on a request type associated with the request. As such, the risk engine may determine a first recursive level when the request is a request to create a new account, a second recursive level when the request is a log-in request for logging in to a user account, and a third recursive level when the request is a request for performing a payment transaction. Furthermore, the risk engine may also determine a recursive level based on an attribute of the request. Thus, for a payment transaction request, the risk engine may determine a first recursive level when an amount associated with the payment transaction request is below a threshold amount, and determine a second recursive level (higher than the first recursive level) when the amount is higher than the threshold amount.

Advantageously, the risk engine of some embodiments may assess a risk level of the risk source based on a combination of the initial security data and the additional security information that is derived from the initial security data using the recursive approach. As will be illustrated herein, the enriched security data may enable the risk engine to assess the risk level of the risk source more comprehensively and may classify the risk source more accurately than using the initial security data alone.

To assist in assessing a risk level of the risk source, the risk engine may generate a fingerprint for the risk source based on the enriched security data. In some embodiments, the fingerprint may represent the security data obtained and derived for the risk source (e.g., the initial security data and the additional security data), the respective recursive levels in which the security data is derived, and the derivation relationship among the security data. Different embodiments may use different techniques to generate the fingerprint. In some embodiments, the risk engine may implement the fingerprint as a particular data structure that includes the initial security data and the additional security information. For example, the risk engine may represent the initial security data and the additional security information in an inter-connected graph, where each piece of security data is represented by a node and each node is connected other nodes that represent security data that is derived from the node. As such, the graph may include a root node that represents the initial security data. The root node may be connected to one or more nodes that represent the first level of additional security information derived from the initial security data. Each of the nodes representing the first level of additional security information may in turn be connected to one or more nodes that represent the second level of additional security information. Thus, the graph in some embodiments may be a tree graph having layers of nodes corresponding to the recursive levels of deriving the additional security information. An advantage of using the graph to represent the enriched security data is that it clearly illustrates a number of recursive levels used in deriving the additional security information and how each piece of additional security information is derived by tracing the node that represents the piece of additional security information to the root node.

In some embodiments, the risk engine may determine a risk level (also referred to as a "risk score") for the risk source by comparing the fingerprint generated for the risk source against other fingerprints associated with known bad risk sources and/or fingerprints associated with known good risk sources. For example, the risk engine may determine the risk level for the risk source based on how similar (or different) the fingerprint generated for the risk source is with such known fingerprints. In some embodiments, the risk engine may assign an initial risk level to the risk source. The risk engine may increase the risk level when it is determined that the fingerprint generated for the risk source overlaps with a fingerprint associated with a known bad risk source (e.g., a bad fingerprint) by a predetermined threshold (e.g., 60%, 70%, 80%, etc.), and may decrease the risk level when it is determined that the fingerprint generated for the risk source overlaps with a fingerprint associated with a known good risk source (e.g., a good fingerprint) by a predetermined threshold (e.g., 60%, 70%, 80%, etc.).

In some embodiments, the overlapping thresholds (also referred to as "similarity thresholds") may also be dynamically determined based on the request. Similar to how the recursive level is determined, the risk engine may determine the overlapping thresholds based on a request type of the request and/or an attribute (e.g., an amount) associated with the request. For example, the risk engine may determine a higher overlapping threshold (e.g., 90%) for overlapping with a bad fingerprint when the request is not critical (e.g., a request for creating a new account), but may determine a lower overlapping threshold (e.g., 60%) for overlapping with a bad fingerprint when the request is critical (e.g., an electronic payment request). Furthermore, the risk engine may determine a higher overlapping threshold (e.g., 70%) for overlapping with a bad fingerprint when the amount associated with the request is below a threshold (e.g., below $1,000), but may determine a lower overlapping threshold (e.g., 50%) for overlapping with a bad fingerprint when the amount associated with the request exceeds the threshold (e.g., above $1,000).

By analyzing and comparing the enriched security data, the risk engine may determine a more accurate risk level for the risk source. For example, the risk engine may determine that the risk source is associated with a cyber-attacker even when the initial security data (e.g., the IP address) does not match any known IP addresses associated with prior cyber-attacks, but some of the other additional security information derived using the recursive approach (e.g., the set of services offered by the IP address and the ports used by the device to provide the set of services) match the profiles (e.g., the fingerprints) of one or more previous cyber-attacks.

In some embodiments, the risk level determined for the risk source may be used by the risk engine to respond to the request (e.g., to authorize or to deny the request). For example, when the risk level is above a certain threshold (e.g., when the fingerprint generated for the risk source matches better with known bad fingerprints than with known good fingerprints), the risk engine may determine to deny the request. When the risk level is below a certain threshold (e.g., when the fingerprint generated for the risk source matches better with known good fingerprints than with known bad fingerprints), the risk engine may determine to authorize the request.

Instead of or in addition to responding to the request, the risk level determined for the risk source may be used to further configure the risk engine. For example, when it is determined that the risk level is above a predetermined threshold, the risk engine may classify the risk source as a known bad risk source, and associate the fingerprint generated for the risk source with a known bad risk source.

Furthermore, the risk engine may incorporate the recursive approach with an access control mechanism based on blacklists and whitelists. For example, when it is determined that the risk source is a bad risk source, the risk engine may add the initial security data associated with the risk source to an existing blacklist. Similarly, when it is determined that the risk source is a good risk source, the risk engine may add the initial security data associated with the risk source to an existing whitelist. The updated blacklist and/or whitelist may be used by the risk engine in analyzing subsequent requests.

Figure 1:
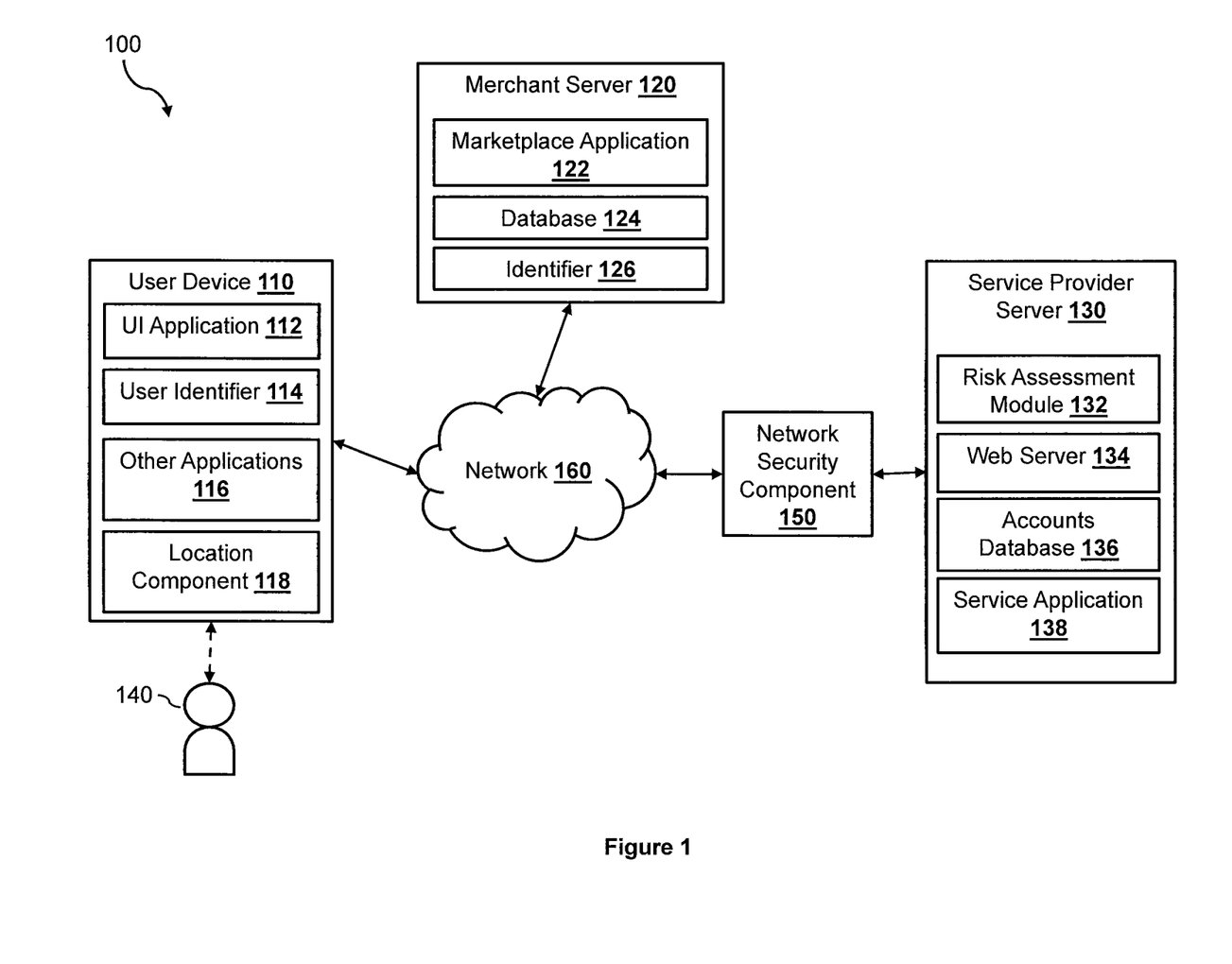
FIG. 1 is a block diagram illustrating an electronic transaction system according to an embodiment of the present disclosure.

FIG. 1 illustrates an electronic transaction system 100 within which the risk engine may be implemented according to one embodiment of the disclosure. The electronic transaction system 100 includes a service provider server 130 associated with an online service provider, a merchant server 120 associated with a merchant, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account with the online service provider to conduct account services or conduct various electronic transactions (e.g., electronic payment transactions, etc.) offered by the online service provider with the service provider server 130. Similarly, the merchant associated with the merchant server 120 may use the merchant server 120 to log in to a merchant account to conduct account services or conduct various electronic transactions (e.g., electronic funds transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a request (e.g., a user login request, a payment transaction request, etc.) to the service provider server 130 via the network 160, and the identifier 114 may be used by the service provider server 130 to associate the user with a particular user account maintained by the service provider server 130. Furthermore, the identifier 114 may be used as the initial security data for generating a fingerprint for the user 140 and/or the user device 110 according to various embodiments of the disclosure.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

The merchant may also use the merchant server 120 to communicate with the service provider server 130 over the network 160. For example, the merchant may use the merchant server 120 to communicate with the service provider server 130 in the course of various electronic services offered by the service provider to a merchant, such as providing an online platform that facilitates electronic payment between customers of the merchant and the merchant itself. For example, the merchant server 120 may use an application programming interface (API) that allows it to offer sale of goods or services in which customers are allowed to make electronic payment through the service provider server 130, while the user 140 may have an account with the service provider server 130 that allows the user 140 to use the service provider server 130 for making electronic payments to merchants that allow use of authentication, authorization, and electronic payment services of the service provider. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the electronic transactions such as searching, selection, purchase, payment of items online, and/or other electronic services offered by the service provider server 130. In one example, the service provider server 130 may be provided by PayPal®, Inc. of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different electronic services offered by the service provider server 130. As a result, a user may access a user account associated with the user and access various services offered by the service provider server 130, by generating HTTP requests directed at the service provider server 130.

In various embodiments, the service provider server includes a risk assessment module 132 that implements and/or incorporates the risk engine as discussed herein. The risk assessment module 132 may be configured to classify a risk level of one or more risk sources (e.g., the user device 110, the merchant server 120) and determine whether to authorize or deny an incoming request from a risk source (e.g., the user device 110 or the merchant server 120). The request may be a request to create a new user account with the online service provider, a log-in request, an electronic fund transfer request, a request for adding an additional funding source, or other types of electronic transaction requests associated with the variety of services offered by the service provider server 130. As such, when a new request is received at the service provider server 130 (e.g., by the web server 134), the risk assessment module 132 may analyze (or evaluate) the request and determine whether the request is possibly an unauthorized/fraudulent request based on information obtained from the request (e.g., the initial security data) and additional information that the risk assessment module 132 may obtain by recursively deriving the additional information according to embodiments of the disclosure. The risk assessment module 132 may transmit an indication of whether the request is possibly an unauthorized/fraudulent request to the web server 134 and/or service application 138 such that the web server 134 and/or the service application 138 may process (e.g., approve or deny) the request based on the indication.

As shown in FIG. 1, the service provider server 130 may be communicatively coupled with a network security component 150 such that any inbound network traffic for the service provider server 130 from the network 160 and any outbound network traffic from the service provider server 130 must go through the network security component 150. In some embodiments, the network security component 150 may be implemented as a firewall. As such, the network security component 150 may be configured to implement a security policy for controlling the inbound and outbound traffic. For example, the network security component 150 may determine which inbound traffic may go through the network security component 150 and reach the service provider server 130 and which inbound traffic may be dropped and/or returned to the sender. In some embodiments, the risk assessment module 132 may configure the network security component 150 based on the enriched security data that the risk assessment module 132 derives from the initial security data. For example, when it is determined that a risk source is a bad risk source, the risk assessment module 132 may update a blacklist maintained by the network security component 150, and when it is determined that a risk source is a good risk source, the risk assessment module 132 may update a whitelist maintained by the network security component 150. The network security component 150 may then use the updated blacklist and/or whitelist to control/direct subsequent inbound traffic for the service provider server 130.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the decision making module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

Figure 2:
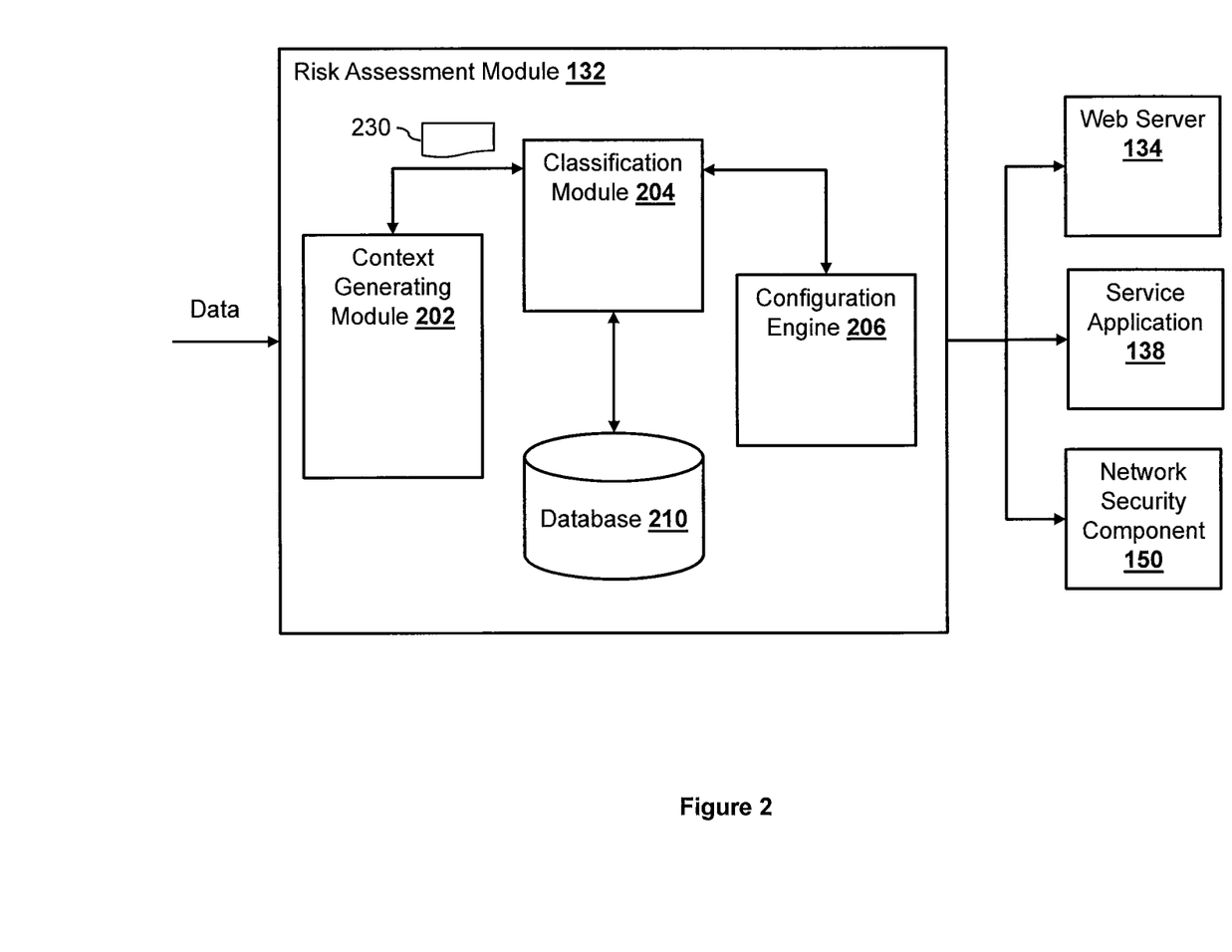
FIG. 2 is a block diagram illustrating a risk assessment module according to an embodiment of the present disclosure.

FIG. 2 illustrates a block diagram of the risk assessment module 132 according to an embodiment of the disclosure. The risk assessment module 132 includes a context generating module 202, a classification module 204, a configuration module 206, and a database 210. In some embodiments, when the risk assessment module 132 receives initial security data associated with a risk source, for example, based on a request submitted to the web server 134, the context generating module 202 may recursively derive additional security information based on the initial security data, and generate a fingerprint for the risk source based on the initial security data. The classification module 204 may determine a risk level for the fingerprint, for example, by comparing the fingerprint generated for the risk source against other fingerprints associated with known good and/or bad risk sources that are stored in the database 210. The classification module 204 may also classify the risk source as good or bad based on the determined risk level. The configuration engine 206 may then configure one or more of the web server 134, the service application 138, and the network security component 150 based on the determined risk level (or the classification) of the risk source.

Figure 3:
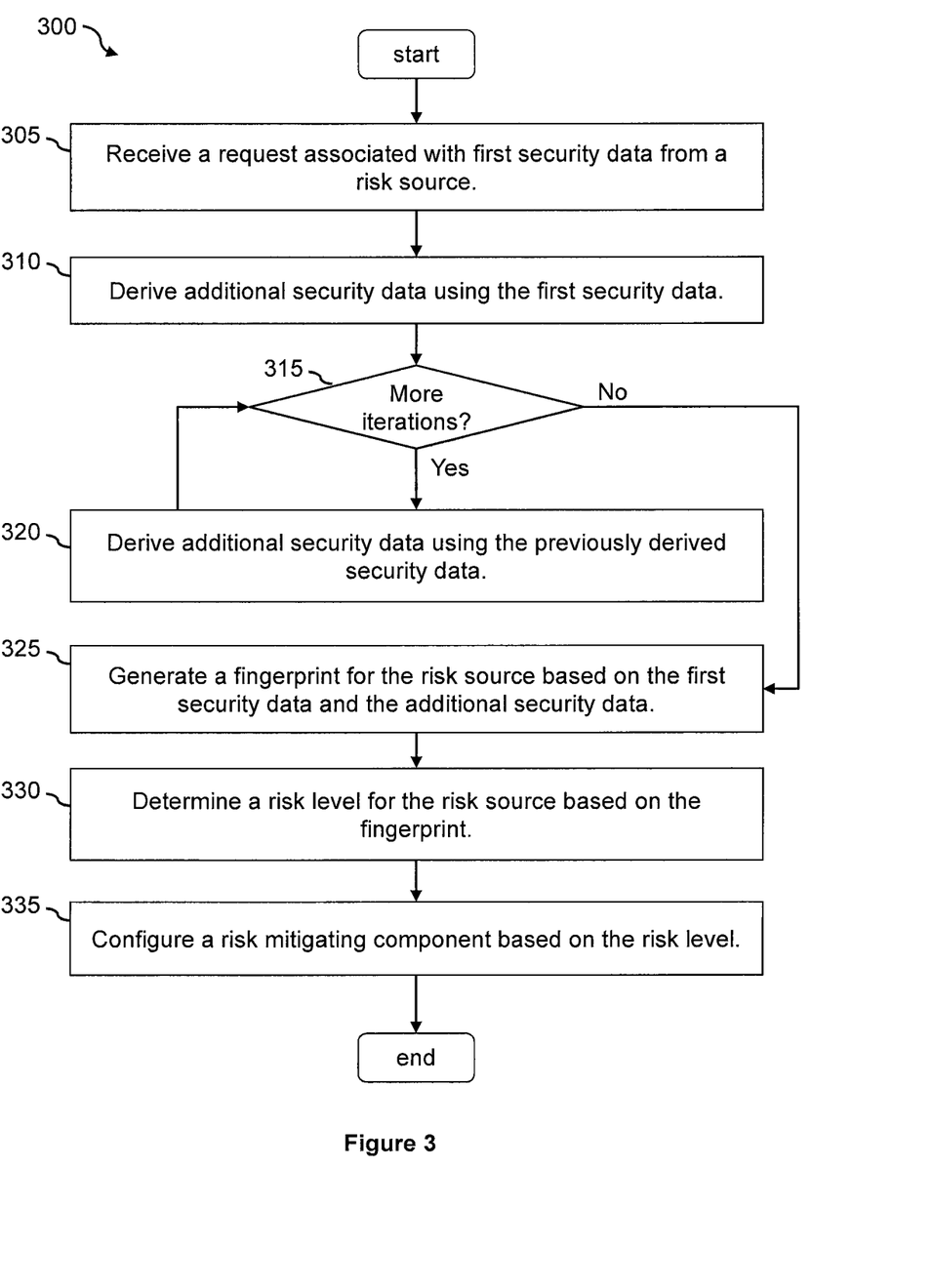
FIG. 3 is a flowchart showing a process of generating enriched security data according to an embodiment of the present disclosure.

FIG. 3 illustrates a process 300 for assessing a risk level of a risk source according to an embodiment of the disclosure. In some embodiments, the process 300 may be performed by the risk assessment module 132. The process begins by receiving (at step 305) a request associated with first security data from a risk source. For example, the risk assessment module 132 may receive a request from the user device 110 that is directed to the web server 134. The request may be a log-in request, a payment transaction request, or a request for any type of services offered by the service provider server 130.

In some embodiments, the risk assessment module 132 may obtain the initial security data from the request itself. For example, by analyzing the request and/or the network packets of the request to obtain the initial security data associated with the risk source. Examples initial security data that can be obtained include an IP address of the device (e.g., the user device 110) that submitted the request, an identifier of a user account associated with the user device 110, and contact data (e.g., a phone number, an email address, etc.) associated with the user device 110.

The process 300 then recursively derives additional security information based on the initial security data, by first deriving (at step 310) additional security data using the first security data, determining (at step 315) whether the predetermined recursive level threshold is reached, and if the predetermined recursive level threshold is not reached, continuing to derive (at step 320) additional security data using the previously derived security data until the recursive level threshold is reached. For example, the context generating module 202 may enrich the initial security data by recursively deriving additional security information based on the initial risk data. For example, the context generating module 202 may derive a first level of additional security information using the initial risk data in a first recursive level. The context generating module 202 may then derive a second level of additional security data using the first level of additional security information in a second recursive level. The context generating module 202 may continue to derive more levels of additional security data using a previous level of additional security data until a predetermined recursive level threshold is reached.

As discussed herein, the risk assessment module 132 may recursively derive additional security information until a predetermined recursive level is reached. In some embodiments, the risk assessment module 132 may determine a fixed recursive level for all analyses. However, in some other embodiments, the risk assessment module 132 may dynamically determine a recursive level for different analyses. For example, when the initial security data (e.g., the IP address) is obtained from a request received by the service provider server 130, the risk assessment module 132 may determine the recursive level for enriching the initial security data based on one or more attributes of the request. In one example, the risk assessment module 132 may determine the recursive level based on a request type associated with the request. As such, the risk assessment module 132 may determine a first recursive level (e.g., a low recursive level such as 2) when the request is a non-critical request such as a request to create a new account, and determine a second recursive level (e.g., higher than the first recursive level such as 4) when the request is a semi-critical request such as a log-in request for logging in to a user account, and determine a third recursive level (e.g., higher than the second recursive level such as 6) when the request is a request for performing a payment transaction. Furthermore, the risk assessment module 132 may also determine a recursive level based on an attribute of the request. Thus, for a payment transaction request, the risk engine may determine a first recursive level when an amount associated with the payment transaction request is below a threshold amount, and determine a second recursive level (higher than the first recursive level) when the amount is higher than the threshold amount.

Figure 4:
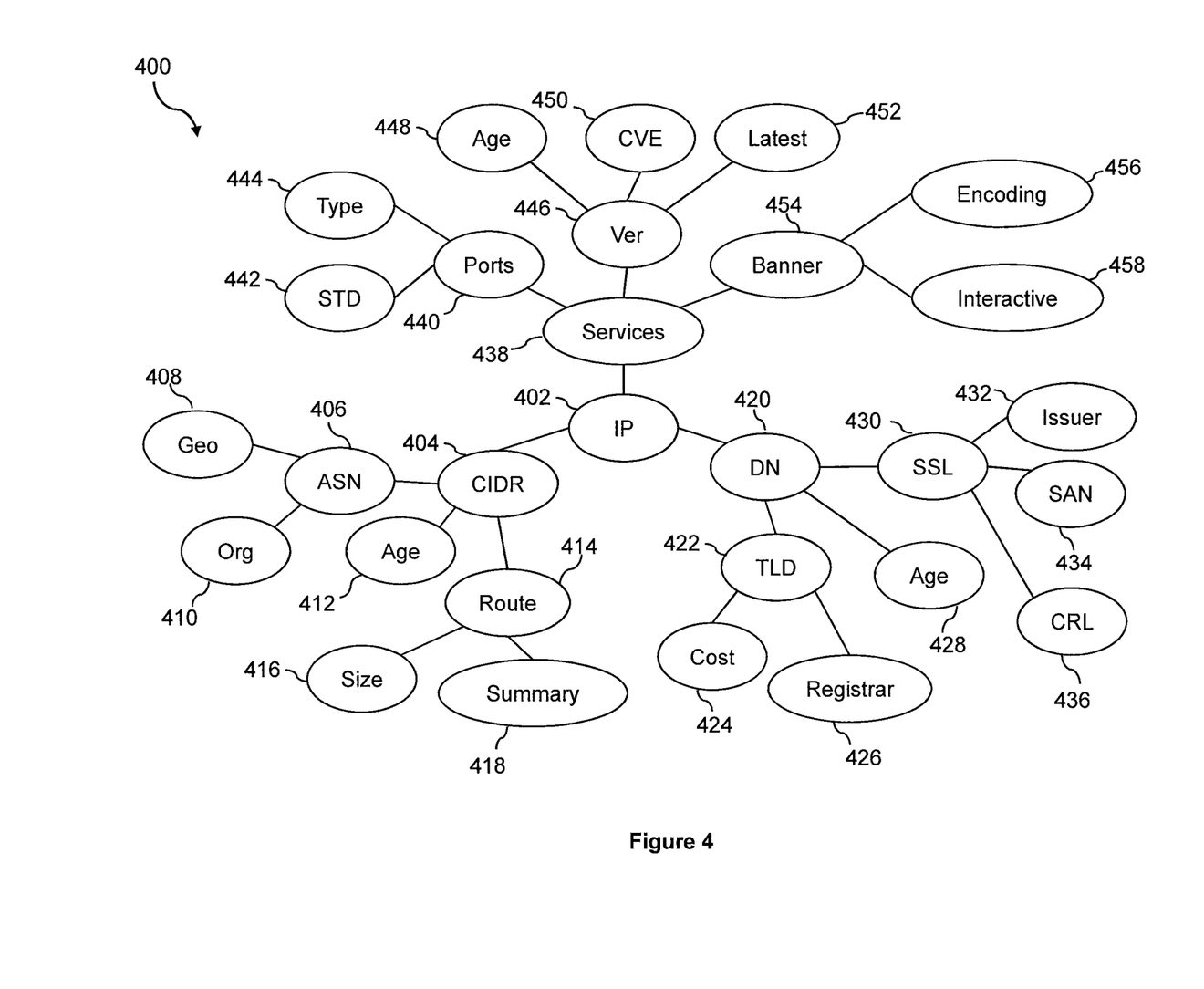
FIG. 4 illustrates an exemplary fingerprint generated for a risk source based on enriched security data according to an embodiment of the present disclosure.

FIG. 4 illustrates a graph 400 that represents example enriched security data generated by the context generating module 202. In this example, the initial security data obtained by the context generating module 202 is an IP address (e.g., 192.0.2.100), and the additional security data is recursively derived based on three recursive levels. The IP address is represented by a node 402. Specifically, the context generating module 202 may derive one or more additional security data (the first level of additional security data) using such the IP address "192.0.2.100." For example, the context generating module 202 may derive a CIDR range of "192.0.2.0/24 (represented by a node 404) by querying a CIDR lookup table using the IP address. The CIDR lookup table may be stored in the database 210 in some embodiments. The context generating module 202 may also derive a domain name of "www.xyc.agency" (represented by a node 420) based on the IP address by querying an external DNS using the IP address. The context generating module 202 may also derive a set of services (e.g., a HyperText Transfer Protocol (HTTP) service, file transfer protocol (FTP) service, etc.) (represented by a node 438) based on the IP address by "pinging" the user device 110.

The context generating module 202 may then derive one or more additional security data (the second level of additional security data) based on the first level of additional security data. For example, based on the CIDR range 404, the context generating module 202 may derive an autonomous system name (ASN) (e.g., 65000) of an autonomous system (represented by a node 406) based on the CIDR 404 by querying an ASN lookup server, an age (e.g., 15 years) (represented by a node 412) of the CIDR by retrieving data from an external server, and whether the CIDR performs IP routing (e.g., true) (represented by a node 414). Based on the domain name 420, the context generating module 202 may derive a top-level domain (e.g., ".agency") (represented by a node 422) by parsing the domain name derived from the IP address, an age of the domain name (e.g., 5 years) (represented by a node 428) by querying an external server such as "www.whois.net," and whether a secure sockets layer (SSL) is used by the domain (e.g., true) (represented by a node 430). Based on the set of services offered by the IP address, the context generating module 202 may derive the ports used for providing the services (e.g., Port 80 for the HTTP service, Port 8080 for the FTP service, etc.) (represented by a node 440) by monitoring the network traffic to and from the IP address, a version of the services (e.g., version 2.1) (represented by a node 446) by querying the user device (e.g., the user device 110) associated with the IP address, and whether the services include a banner (e.g., true) (represented by a node 454) by querying the user device (e.g., the user device 110) associated with the IP address.

The context generating module 202 may then derive one or more additional security data (the third level of additional security data) based on the second level of additional security data. For example, based on the ASN 406, the context generating module 202 may derive a geographical location associated with the IP address (e.g., Canada) (represented by a node 408) and an organization (e.g., XYZ Agency) (represented by a node 410) associated with the ASN. Based on the determination that IP routing is available for the CIDR, the context generating module 202 may determine a size of IP addresses that the CIDR may route (e.g., 256) (represented by a node 416) and a summary (e.g., "192.0.0.0/9") (represented by a node 418).

Based on the top-level domain 422 (e.g., ".agency"), the context generating module 202 may derive a cost for register a domain under such TLD (e.g., $99) (represented by a node 424) and a registrar (e.g., Verisign) (represented by a node 426) by querying a generic top-level domain (gTLD) registry or a country code top-level domain (ccTLD) registry. Based on the determination that SSL is offered by the domain name associated with the IP address, the context generating module 202 may derive an issuer (e.g., Symantec) of the SSL certificate (represented by a node 432), a Subject Alternate Name (SAN) of the SSL certificate (represented by a node 434), and a certificate revocation list (CRL) issued by the issuer 432 (represented by a node 436).

Based on the Ports 440, the context generating module 202 may derive a type of the port (e.g., reserved, non-reserved, etc.) (represented by a node 444) and whether the port is a standard port (e.g., yes) (represented by a node 442). Based on the version of the service 446, the context generating module 202 may derive an age (e.g., 1 year) that the version of the services has been provided by the IP address (represented by a node 448), a CVE (represented by a node 450) of the version of the services, and whether the version is the latest (e.g., true) (represented by a node 452) of the services. Based on the determination that the services 438 offers a banner 454, the context generating module 202 may derive an encoding (e.g., JavaScript) (represented by a node 456) of the banner and whether the banner is interactive (e.g., false) (represented by a node 458).

Since the recursive derivation of additional security data has reached the predetermined recursive level threshold (3 in this example), the context generating module 202 may stop from continuing to derive additional data using the third level of security data.

Referring back to FIG. 3, when it is determined (at step 315) that the recursive level has reached the threshold level, the process 300 generates (at step 325) a fingerprint for the risk source based on the first security data and the additional security data. For example, the context generating module 202 may generate a fingerprint 230 for the risk source (e.g., the user device 110 or the user 140) based on the initial security data (the IP address) and all the additional security data derived based on the recursive process (steps 310 through 320). Different embodiments may use different techniques to generate the fingerprint 230. In some embodiments, the context generating module 202 may generate the fingerprint 230 in the form of an inter-connected graph, such as the graph 400 as shown in FIG. 4.

As shown in FIG. 4, the graph 400 includes nodes 402-458, where each node represents a piece of security data. The graph 400 has a root node 402 that represents the initial security data (e.g., the IP address). The root node 402 is connected to nodes 404, 420, and 438 representing the first level of additional security data that is derived from the initial security data by the context generating module 202. The node 404 representing the CIDR range of the IP address is connected to the nodes 406, 412, and 414 representing the second level of additional security data that is derived from the CIDR range 404 by the context generating module 202 (e.g., the ASN 406, the age of the CIDR 412, and whether the CIDR offers IP routing services 414). Similarly, the node 420 representing the domain name associated with the IP address is connected to the nodes 422, 428, and 430 representing the second level of additional security data that is derived from the domain name 420 by the context generating module 202 (e.g., the top-level domain 422 of the domain name, the age of the domain 428, and whether the domain offers SSL 430), and the node 438 representing the services offered by the IP address is connected to the nodes 440, 446, and 454 representing the second level of additional security data that is derived from the services 438 by the context generating module 202 (e.g., the ports used by the services 440, the version of the services 446, and whether the services offers a banner 454).

The node 406 representing the ASN of the CIDR 404 is connected to the nodes 408 and 410 representing the third level of additional security data that is derived from the ASN 406 by the context generating module 202 (e.g., the geographical area of the ASN 408 and the organization associated with the ASN 410). Similarly, the node 414 representing whether the CIDR offers IP routing services is connected to the nodes 416 and 418 representing the third level of additional security data that is derived from the ASN 406 by the context generating module 202 (e.g., the size of IP addresses routable by the CIDR 416 and the summary of the routing 418). The node 406 representing the top-level domain 422 of the domain 420 is connected to the nodes 424 and 426 representing the third level of additional security data that is derived from the TLD 422 by the context generating module 202 (e.g., the cost for registering a domain 424 and the registrar associated with the TLD 426). The node 430 representing whether the domain name offers SSL is connected to the nodes 432, 434, and 436 representing the third level of additional security data that is derived from the SSL 430 by the context generating module 202 (e.g., an issuer of the SSL certificate 432, the SAN of the certificate 434, and the CRL of the issuer 436). The node 440 representing the ports used by the services 438 is connected to the nodes 442 and 444 representing the third level of additional security data that is derived from the ports 440 by the context generating module 202 (e.g., whether the port is a standard port 442 and the type of the port 444). The node 446 representing the version of the services 438 is connected to the nodes 448, 450, and 452 representing the third level of additional security data that is derived from the version 446 by the context generating module 202 (e.g., the age of the version of the services 448, the CVE of the services 450, and whether the version is the latest version of the services 452). The node 454 representing the banner of the services 438 is connected to the nodes 456 and 458 representing the third level of additional security data that is derived from the banner 454 by the context generating module 202 (e.g., the encoding of the banner 456 and whether the banner is interactive 458).

Figure 5:
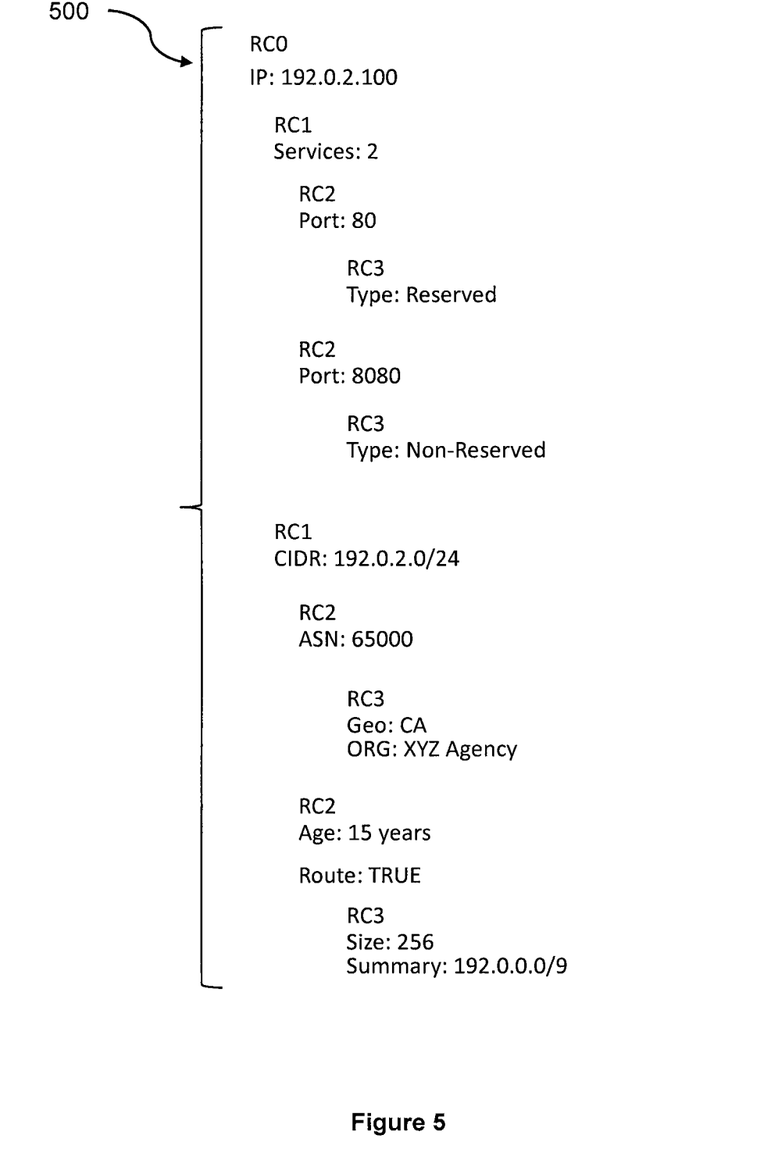
FIG. 5 illustrates another exemplary fingerprint generated based on enriched security data according to an embodiment of the present disclosure.

In some embodiments, the context generation module 202 may generate the fingerprint 230 in a structured text format (e.g., XML, JSON, etc.). FIG. 5 illustrates an example data structure 500 that represents the fingerprint 230 of the risk source (e.g., the user device 110). As shown, the data structure 500 indicates that the IP address "192.0.2.100" as the initial security data using the label "RC0". The first level of additional security data (e.g., the Services, the CIDR, etc.) is indicated using the label "RC1", the second level of additional security data (e.g., the ports, the ASN, the age, the route, etc.) is indicated with the label "RC2", and the third level of additional security data (e.g., the port type, the geographical region, the organization name, etc.) is indicated using the label "RC3".

After a fingerprint is generated for the risk source, the process 300 determines (at step 330) a risk level for the risk source based on the fingerprint. For example, the classification module 204 may determine a risk level for the risk source based on the fingerprint 230. In some embodiments, the risk assessment module 132 may store one or more fingerprints previously generated for other risk sources in the database 210. For example, based on previous analyses of the other risk sources, a risk level may be assigned to each of the other risk sources. The different risk levels may simply include two levels (e.g., good or bad). Alternatively, the risk levels may be more sophisticated and may include more levels based on a scale (e.g., 1-10, 1-5, etc.).

As such, in some embodiments, the classification module 204 may determine a risk level for the risk source by comparing the fingerprint 230 against the stored fingerprints. In some embodiments, the classification module 204 may first assign a neutral risk level to the fingerprint 230 (e.g., a risk level of 3 in a scale of 1-5). The classification module 204 may then begin comparing the fingerprint 230 against the stored fingerprints, and may adjust the risk level of the fingerprint 230 based on the comparison. For example, the classification module 204 may increase the risk level of the fingerprint 230 when a similarity (e.g., a calculated similarity score) between the fingerprint 230 and a fingerprint of a known bad risk source (e.g., having a risk level above 3) exceeds a predetermined threshold, and may reduce the risk level of the fingerprint 230 when a similarity (e.g., a calculated similarity score) between the fingerprint 230 and a fingerprint of a known good risk source (e.g., having a risk level below 3) exceeds a predetermined threshold.

Figure 6:
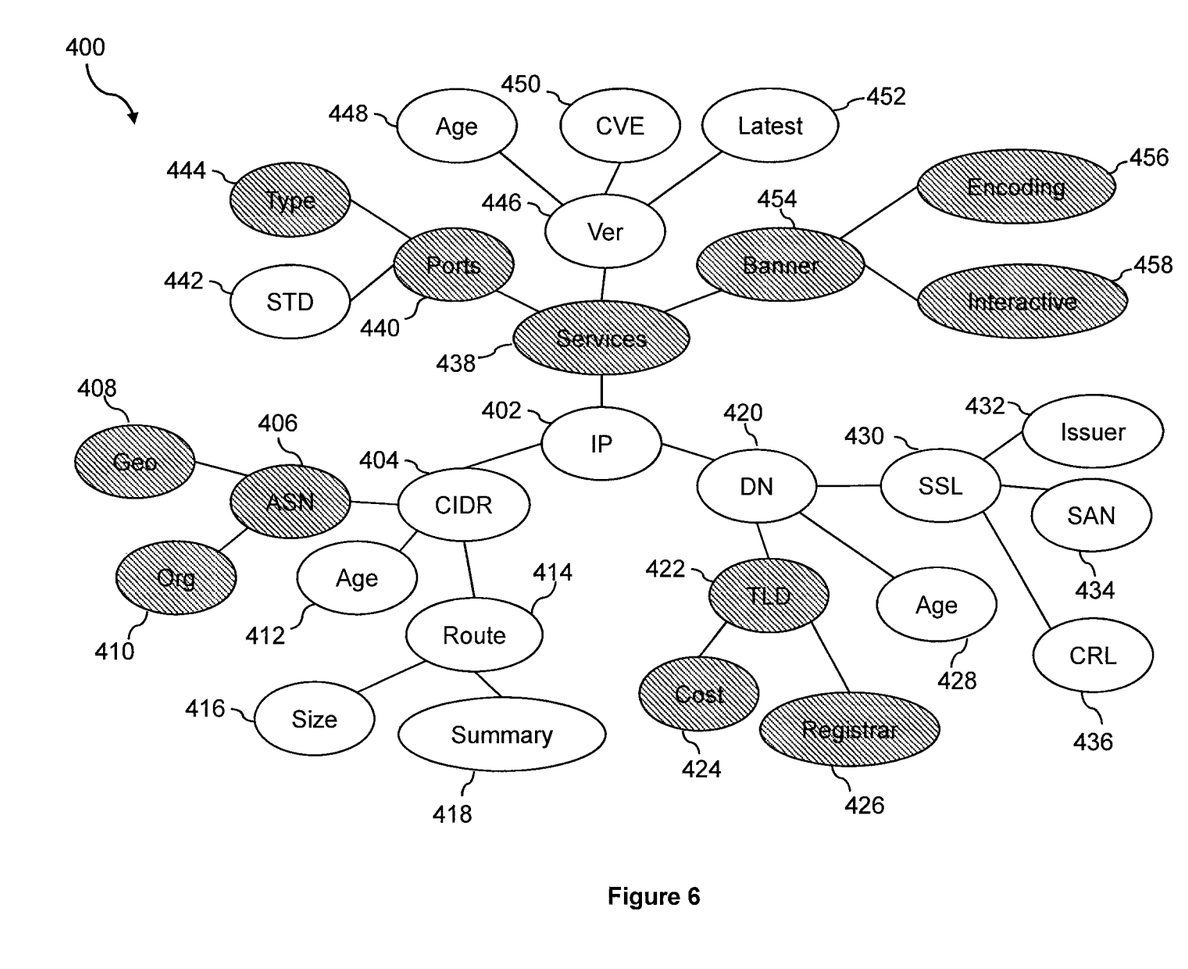
FIG. 6 illustrates a comparison between two fingerprints according to another embodiment of the present disclosure.

In some embodiments, the similarity score between the fingerprint 230 and another fingerprint is determined based on a number of common (e.g., shared) security data. FIG. 6 illustrates an example comparison between the fingerprint 230 and one other fingerprint of a known bad risk source. In this comparison, the classification module 204 determines that the security data, including the ASN (represented by the node 406), the geographical location (represented by the node 408), the organization (represented by the node 410), the top-level domain (represented by the node 422), the cost (represented by the node 424), the registrar (represented by the node 426), the services (represented by the node 438), the ports (represented by the node 440), the port type (represented by the node 444), the banner (represented by the node 545), the encoding of the banner (represented by the node 456), and whether the banner is interactive (represented by the node 458), are shared between the fingerprint 230 and the other fingerprint, as indicated by the shaded nodes. As such, in some embodiments, the classification module 204 may determine a similarity score of 12/29 (nine shared security data out of a total of 29 security data). The classification module 204 may increase the risk level of the fingerprint 230 if the score of 12/29 exceeds a predetermined threshold.

As discussed above, sophisticated cyber-attackers have been using various techniques to defeat and/or circumvent traditional security measures. For example, it is known that some cyber-attackers use a large set of proxies and botnets to make it appear that the risk source comes from different IP addresses and/or different domains. The type of techniques used by these sophisticated cyber-attackers may easily change the top level(s) of security data (e.g., the initial security data representing the IP address, the first level of additional security data). In the example of using proxies and/or botnets, the cyber-attackers may make the attack appear to come from a different IP address or even having a different CIDR range than the risk source used in a previous attack. However, while it may be easy to change the top level attributes of the attack, the underlying data may remain the same (e.g., they may use the same services to launch the attack, the same kind of banner, the same encoding for the banner, etc.). As such, the classification module 204 may assign a higher weight to having shared security data that is derived in the top level (e.g., the lower level) of additional security data (e.g., the first level of additional security data), and assign a lower weight to having shared security data that is derived in the bottom level (e.g., the higher level) of additional security data) (e.g., the second level or the third level of additional security data. As such, the weights assigned to sharing the ASN (the node 406), the top-level domain (the node 422), the ports (the node 440), and the banner (454) (representing the second level of additional security data) may be higher than the weights assigned to the services (the node 438) (representing the first level of additional security data)

Instead of or in addition to assigning weights based on the level of recursion from which the security data is derived, the classification module 204 may also assign weights to each security data (e.g., each node in the graph 400) based on which sub-graph (e.g., sub-group or a branch in the graph) to which the security data belongs. Each sub-graph in the graph 400 may be represented by a pseudo-root node, and the sub-graph includes all of the nodes that are downstream to the pseudo-root node. For example, when it is determined that the CIDR security data family (e.g., the pseudo node being the node 404, and the sub-graph includes the node 404 and all of the nodes downstream of the node 404, including the nodes 406-418) is more indicative for assessing the risk level of the fingerprint 230 than other security data families, the classification module 204 may assign a higher weight to the sub-graph including the nodes 404-418 than the nodes in other sub-graphs. In this example, the shared ASN data (represented by the node 406), geographical location data (represented by the node 408), and organization data (represented by the node 410) would have more weights (e.g., more influential to the resulting similarity score) than the other shared security data. Since the graph 400 represents multiple level of additional security data, the sub-graph may have a pseudo-node that is at any one of the levels. While the sub-graph in the example discussed above has the node 404 representing CIDR data as the pseudo node (thus the sub-graph includes the nodes 404-418), another sub-graph may exist having a pseudo-node 406 representing the ASN data, and this other sub-graph includes the nodes 406-410. A third sub-graph may have a pseudo-node 422 representing the top-level domain, and the third sub-graph includes the nodes 422-426. A fourth sub-graph may have a pseudo-node 420, and the fourth sub-graph may include the nodes 420-436. The classification module 204 may assign different weights to each of these sub-graphs such that sharing security data within these different sub-graphs may be weighted differently in the calculation of the similarity score.

After assigning the weights to the different nodes in the graph 400, the classification module 204 may calculate the similarity score for the comparison based on the assigned weight. The classification module 204 may then compare the calculated similarity score against a predetermined threshold and adjust the risk level of the risk source accordingly. In some embodiments, the classification module 204 may use a different threshold based on the characteristics of the fingerprint that the fingerprint 230 is compared against. For example, the classification module 204 may use a first similarity threshold for comparing against fingerprints associated with good risk sources (e.g., risk levels below a predetermined level), and use a second similarity threshold for comparing against fingerprints associated with bad risk sources (e.g., risk levels above a predetermined level).

In some embodiments, the classification module 204 may dynamically determine the similarity thresholds. For example, the classification module 204 may determine the similarity thresholds based on attributes of the request (e.g., a request type, an amount associated with the request, etc.) the triggers the risk level assessment. In one example, the classification module 204 may determine a higher second (bad) similarity threshold (e.g., 90%) when the request is not critical (e.g., a request for creating a new account), but may determine a lower second (bad) similarity threshold (e.g., 60%) when the request is critical (e.g., an electronic payment request). Furthermore, the classification module 204 may determine a higher second (bad) similarity threshold (e.g., 70%) when the amount associated with the request is below a threshold (e.g., below $1,000), but may determine a lower second (bad) similarity threshold (e.g., 50%) for when the amount associated with the request exceeds the threshold (e.g., above $1,000). The classification module 204 may then adjust the risk level for the fingerprint 230 based on the comparison against the stored fingerprints and the dynamically generated thresholds.

Advantageously, using the techniques disclosed herein, the risk assessment module 132 of some embodiments may assess a risk level of the risk source based on enriched security information (e.g., a combination of the initial security data and the additional security information that is derived from the initial security data using the recursive approach disclosed herein). The enriched security data may enable the risk engine to assess the risk level of the risk source more comprehensively and may classify the risk source more accurately than using the initial security data alone. Importantly, as illustrated in the examples given above, fingerprints of known sources (good or bad) may still influence (used by the classification module 204 to modify) the risk level of the fingerprint 230 even though the initial security data (e.g., the IP address) is different. As such, the risk assessment module of 132 may accurately classify the risk source (e.g., the user device 110) as a bad risk source even though the IP address of the user device 110 is not on any threat list or blacklist, but some of the other attributes derived from the IP address of the user device 110 are shared with one or more other bad risk sources.

Referring back to FIG. 3, the process 300 may then configure (at step 335) a risk mitigating component based on the determined risk level of the risk source. For example, the configuration engine 206 may configure at least one of the web server 134, the service application 138, or the network security component 150 based on the risk level determined for the fingerprint 230. When the initial security data was obtained from an incoming request to the web server 134 and/or the service application 138 (e.g., a login request, a request to perform an electronic payment transaction, etc.), the configuration engine 206 may configure the web server 134 and/or the service application 138 to authorize or deny the request based on the determined risk level.

In some embodiments, the network security component 150 may store a blacklist and/or a whitelist for controlling access to the service provider server 130. In some of these embodiments, the good fingerprints and the bad fingerprints may be generated based on the blacklist and whitelist of risk sources. Once the risk level is determined for the risk source associated with the device 110, the configuration engine 206 may further update the blacklist and/or the whitelist managed by the network security component 150. For example, when the risk level determined for the user device 110 is above a predetermined threshold, the configuration engine 206 may add the risk source (e.g., the IP address) to the blacklist, and when the risk level determined for the user device 110 is below a predetermined threshold, the configuration engine 206 may add the risk source (e.g., the IP address) to the whitelist. The network security component 150 may then use the updated blacklist and whitelist to authorize/deny subsequent accesses to the service provider server 130.

In some embodiments, the initial security data obtained by the risk assessment module 132 may not be triggered by a request to the service provider server 130. Instead, the risk assessment module 132 may determine that a merchant associated with the merchant server 120 is performing a network migration. Thus, the merchant server 120 may obtain a new IP address and possibly other networking attributes as a result of the migration. The risk assessment module 132 may (without a request submitted by the merchant server 120) perform a risk assessment on the new networking attributes of the merchant server 120 using the process disclosed herein. When it is determined that the new networking attributes of the merchant server 120 conform to a good risk source based on the assessment, the risk assessment module 132 may add the new networking attributes (e.g., the new IP address) of the merchant server 120 to a whitelist (e.g., the whitelist managed by the network security component 150), such that subsequent requests submitted by the merchant server 120 may be authorized without delay. In other words, the merchant server 120, after being migrated, has been pre-approved by the risk assessment module 132 based on the risk assessment process performed.

Figure 7:
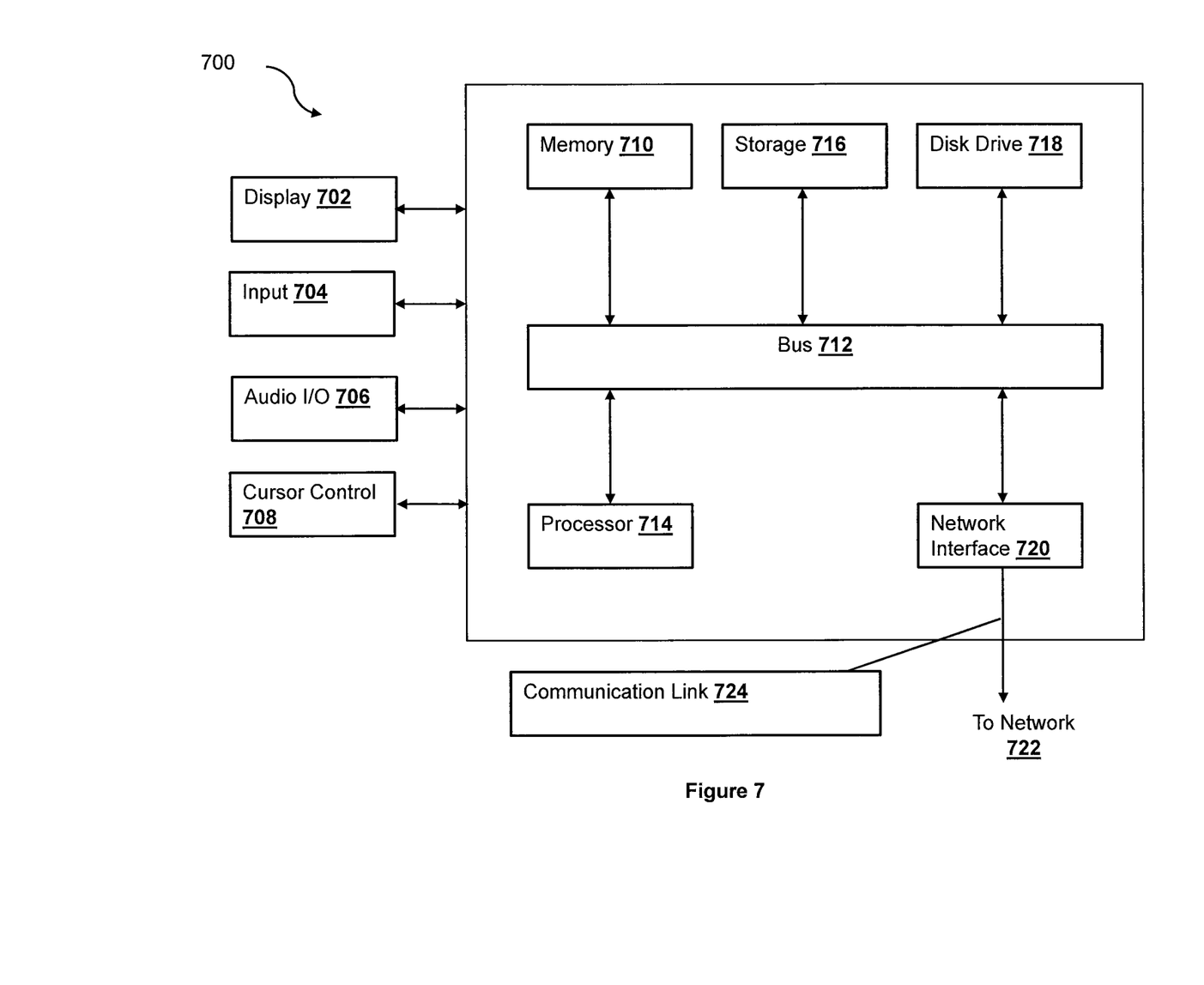
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the risk assessment functionalities described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a risk source, a request for performing an electronic transaction, wherein the request is associated with first security data;
deriving a first level of security data using the first security data;
generating enriched security data for the risk source by recursively deriving an additional level of security data using a previous level of security data until a predetermined recursive level is reached;
generating a first fingerprint based on the enriched security data;
determining a risk level for the risk source by (i) comparing the first fingerprint against a second fingerprint associated with a first risk type and (ii) comparing the first fingerprint against a third fingerprint associated with a second risk type; and
authorizing or denying the electronic transaction based on the risk level determined for the risk source.

2. The system of claim 1, wherein the electronic transaction comprises an electronic payment transaction associated with an amount, wherein the operations further comprise determining the predetermined recursive level for generating the enriched security data based on the amount.

3. The system of claim 1, wherein the operations further comprise:
determining a request type associated with the request; and
determining the predetermined recursive level for generating the enriched security data based on the request type associated with the request.

4. The system of claim 1, wherein the determining the risk level further comprises determining, based on the comparing the first fingerprint against the second fingerprint, a first similarity score indicating an amount of shared security data between the first fingerprint and the second fingerprint, wherein the risk level is determined based on the first similarity score.

5. The system of claim 4, wherein the operations further comprise assigning weights to different security data in the first fingerprint, and wherein the first similarity score is determined further based on the weights assigned to the different security data in the first fingerprint.

6. The system of claim 1, wherein the first security data comprises an Internet Protocol (IP) address, wherein the first level of security data comprises a Classless Inter-Domain Routing (CIDR) range associated with the IP address, and wherein a second level of security data derived from the first level of security data comprises an autonomous system number (ASN) associated with the CIDR.

7. The system of claim 1, wherein the operations further comprise:
updating a whitelist associated with a risk assessment engine by adding the risk source to the whitelist based on the determined risk level; and
authorizing a second request based on the updated whitelist.

8. A non-transitory machine-readable medium having stored thereon machine-readable instructions executable to cause a machine to perform operations comprising:
receiving, from a risk source, a request for performing an electronic transaction, wherein the request is associated with first security data;
deriving a first level of security data using the first security data;
generating enriched security data for the risk source by recursively deriving an additional level of security data using a previous level of security data until a predetermined recursive level is reached;
generating a first fingerprint based on the enriched security data;
comparing the first fingerprint against at least a second fingerprint associated with a first risk type;
determining, based on the comparing, a first similarity score indicating an amount of shared security data between the first fingerprint and the at least second fingerprint;
determining, for the risk source, a risk level based on the first similarity score; and
authorizing or denying the electronic transaction based on the risk level determined for the risk source.

9. The non-transitory machine-readable medium of claim 8, wherein the electronic transaction comprises an electronic payment transaction associated with an amount, wherein the operations further comprise determining the predetermined recursive level for generating the enriched security data based on the amount.

10. The non-transitory machine-readable medium of claim 8, wherein the operations further comprise:
determining a request type associated with the request; and
determining the predetermined recursive level for generating the enriched security data based on the request type associated with the request.

11. The non-transitory machine-readable medium of claim 8, wherein the determining the risk level further comprises comparing the first fingerprint against a third fingerprint associated with a second risk type.

12. The non-transitory machine-readable medium of claim 8, wherein the operations further comprise assigning weights to different security data in the first fingerprint, and wherein the first similarity score is determined further based on the weights assigned to the different security data in the first fingerprint.

13. The non-transitory machine-readable medium of claim 8, wherein the operations further comprise:

updating a whitelist associated with a risk assessment engine by adding the risk source to the whitelist based on the determined risk level; and
authorizing a second request based on the updated whitelist.

14. A method comprising:
receiving, by one or more hardware processors from a risk source, a request for performing an electronic transaction, wherein the request is associated with first security data;
deriving, by the one or more hardware processors, a first level of security data using the first security data;
generating, by the one or more hardware processors, enriched security data for the risk source based on the first level of security data by recursively deriving an additional level of security data using a previous level of security data until a predetermined recursive level is reached;
generating, by the one or more hardware processors, a first fingerprint based on the enriched security data;
determining, by the one or more hardware processors, a risk level for the risk source by (i) comparing the first fingerprint against a second fingerprint associated with a first risk type and (ii) comparing the first fingerprint against a third fingerprint associated with a second risk type; and
authorizing or denying, by the one or more hardware processors, the electronic transaction based on the risk level determined for the risk source.

15. The method of claim 14, wherein the electronic transaction comprises an electronic payment transaction associated with an amount, wherein the method further comprises determining the predetermined recursive level for generating the enriched security data based on the amount.

16. The method of claim 14, further comprising:
determining a request type associated with the request; and
determining the predetermined recursive level for generating the enriched security data based on the request type associated with the request.

17. The method of claim 14, wherein the determining the risk level further comprises determining, based on the comparing, a first similarity score indicating an amount of shared security data between the first fingerprint and the second fingerprint, and wherein the risk level is determined based on the first similarity score.

18. The method of claim 17, further comprising assigning weights to different security data in the first fingerprint, wherein the first similarity score is determined further based on the weights assigned to the different security data in the first fingerprint.

19. The method of claim 14, further comprising:
updating a blacklist associated with a risk assessment engine by adding the risk source to the blacklist based on the determined risk level; and
denying a second request based on the updated blacklist.

20. The method of claim 14, wherein the first security data comprises an Internet Protocol (IP) address, wherein the first level of security data comprises a Classless Inter-Domain Routing (CIDR) range associated with the IP address, and wherein a second level of security data derived from the first level of security data comprises an autonomous system number (ASN) associated with the CIDR.

* * * * *